United States Patent Office 3,454,306
Patented July 8, 1969

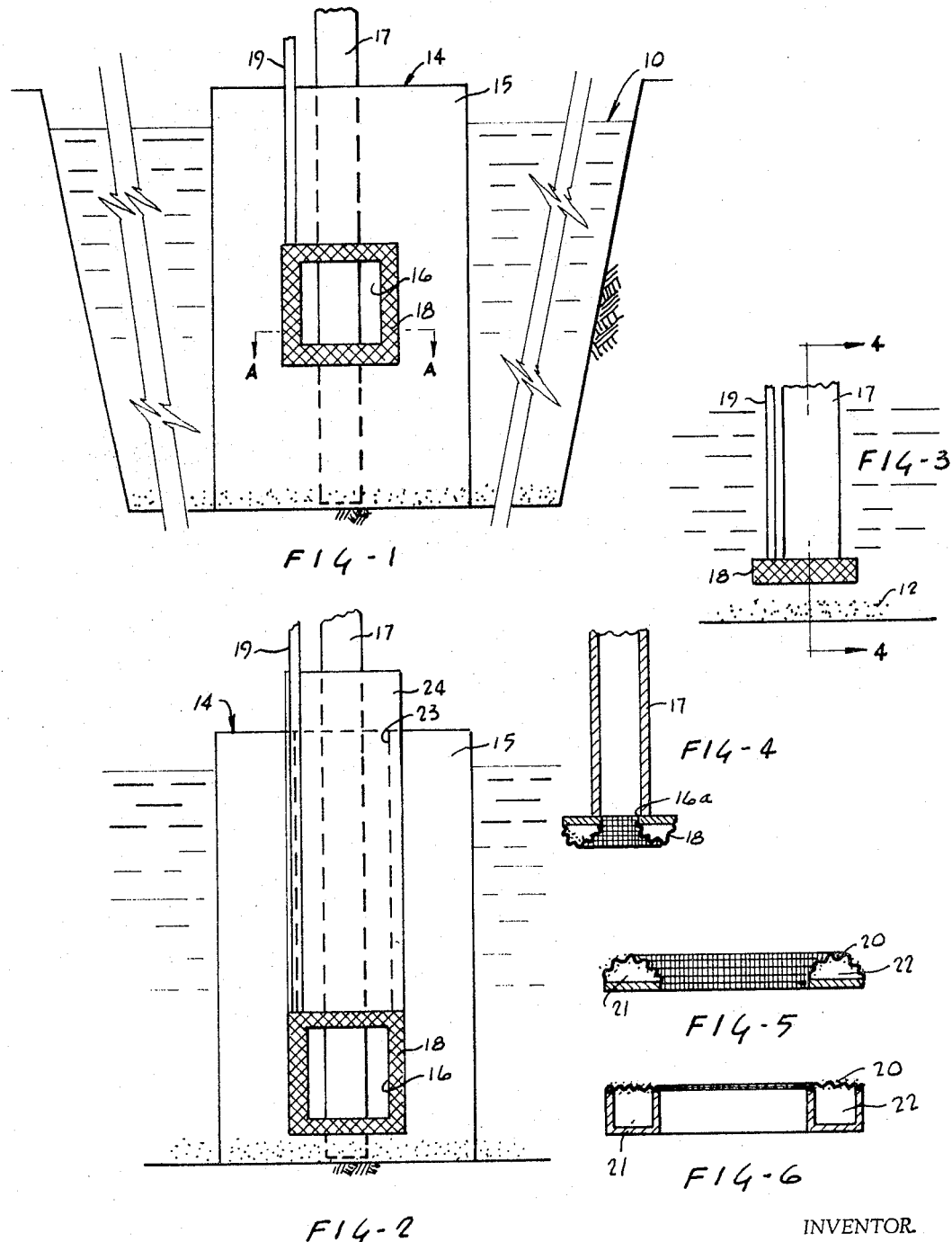

3,454,306
**METHOD AND APPARATUS FOR WITHDRAW-
ING A SUPERSATURATED SOLUTION FROM
A CONTAINER**
Albert E. Culp, Trona, Calif., assignor, by mesne assignments, to American Potash & Chemical Corporation, a corporation of Delaware
Filed July 10, 1967, Ser. No. 652,128
Int. Cl. B65g 53/30
U.S. Cl. 302—15                              6 Claims

ABSTRACT OF THE DISCLOSURE

A method and apparatus for withdrawing from a container a solution which is supersaturated with a salt while preventing the salt from depositing and accumulating on intakes, pipes, pumps and other conveying means used to remove the solution from the container. A porous dilution chamber is disposed at the periphery of the inlet to the conveying means and a dilution liquid is introduced into the porous chamber. As the supersaturated solution passes through the inlet, in being removed from the container, it is diluted with the dilution liquid flowing from the porous chamber. The supersaturation of the solution is thereby reduced and deposition and accumulation of salt from the solution onto the intake, pipes and pumps is prevented.

Background of the invention

*Field of the invention.*—This invention relates to a method and apparatus for removing from a container a solution which is supersaturated with a salt. More particularly, it relates to a method and apparatus for preventing the deposition and accumulation of salt on conveying means such as pipes, pumps, inlets, weirs and the like, used to remove a solution supersaturated with a salt, from a container.

*Description of the prior art.*—In recent years, the recovery of chemicals from brine solutions by solar evaporation techniques has become of considerable commercial significance. According to these processes, a brine solution such as Searles Lake brine, Great Salt Lake brine, Dead Sea brine, sea water and the like is pumped into one or more evaporating ponds where the brine is concentrated by solar evaporation. As the concentration of the brine solution is increased by evaporation of water therefrom, the solution becomes supersaturated with salt, particularly NaCl, which crystallizes out of solution and deposits on the bottom of the pond. The concentrated solution in the pond remains supersaturated with the salt. The concentrated brine is then removed from the evaporating pond for further treatment to recover other chemicals contained in the brine. For example, the brine may be transferred into additional concentrating ponds where the concentration of the brine is further increased to crystallize and deposit other salts from the brine. Alternatively, the concentrated brine may be pumped from the pond and subjected to physical and/or chemical treatment to recover chemicals therefrom.

While such solar evaporation techniques are generally a relatively simple and inexpensive way in which to recover chemicals from brine solutions, such techniques are subject to a number of disadvantages which tend to limit their use. For example, it has been found that when the concentrated brine, which is supersaturated with salt, is pumped from the evaporating pond the salt tends to deposit and accumulate on intakes, pipes, pumps and other equipment which is in contact with the concentrated brine as it is removed from the pond. This salt accumulation rapidly clogs the intakes and pipes and interferes with the operation of the pumps whereby flow of brine from the pond is greatly reduced after only short periods of operation.

It has been suggested heretofore to add a small amount of dilution water to the concentrated brine before the brine is removed from the pond in order to reduce the supersaturation of the solution. While this procedure generally has prevented salt deposits from forming in the pipes and pumps, it has failed to prevent the deposition and accumulation of salt on the inlet to the conveying means. That is, the deposition and accumulation of salt in the region of the inlet where the supersaturated solution first enters the removal conveying system still presents a problem which has not been solved heretofore in a completely satisfactory manner.

Summary of the invention

The present invention provides a method and apparatus which does satisfactorily solve that problem whereby it now is possible to withdraw a solution, which is supersaturated with a salt, from a container without such salt depositing and accumulating on the inlet of the conveying means and in other portions thereof including associated pipes, pumps and the like.

Broadly, in accordance with this invention, a porous dilution chamber is disposed substantially about the periphery of the inlet of the conveying means and a relatively small amount of a dilution liquid is supplied to such chamber as the supersaturated salt solution enters the inlet for removal from the container. As the supersaturated solution is diluted, its supersaturation is reduced whereby the solution may be withdrawn uninterruptedly from the container for extended periods of time with little or no deposition of salt on the equipment.

Preferably, the inlet of the conveying means and the dilution chamber are vertically moveable in the container whereby they may be raised as salts accumulate at the bottom of the container, thereby preventing the inlet from being blocked by this salt layer.

While the present invention is particularly described and illustrated as applied to the removal of brine solution from a solar evaporating pond, it is to be understood that this invention has more general application. Thus, the invention is suitable for use in withdrawing from settling ponds or basins, tanks, reactors and other containers solutions which are supersaturated with a salt which normally tends to deposit out of solution onto pipes, pumps and other conveying means used to remove such solutions from their containers.

Description of the drawing

The present invention and the advantages thereof will be more clearly understood from the following description and the drawing in which:

FIGURE 1 is a sectional view of a solar evaporating pond illustrating conveying means for removing supersaturated brine from the pond utilizing one embodiment of this invention.

FIGURE 2 is an elevation view of conveying means for removing a supersaturated solution from a container, illustrating a preferred embodiment of this invention.

FIGURE 3 is an elevation view of conveying means for removing a supersaturated solution from a container, illustrating another embodiment of the invention.

FIGURE 4 is a sectional view taken along line 4—4 of FIGURE 3.

FIGURES 5 and 6 are enlarged sectional views taken along line A—A of FIGURE 1 illustrating two embodiments of the porous dilution chamber of the present invention.

Description of the embodiments

Referring now to the drawing in FIGURE 1, there is shown a solar evaporating pond 10 containing an aqueous brine solution 11. As discussed hereinabove, as the brine solution 11 becomes concentrated by evaporation of water therefrom, the solution becomes supersaturated and salt crystallizes out of solution and deposits as a layer 12 of progressively increasing thickness on the bottom of the pond. The concentrated solution in the pond remains supersaturated with the salt.

The supersaturated solution is withdrawn from the pond through conveying means 14 disposed within the pond. According to one preferred embodiment of the invention, the conveying means includes an intake tank 15 having at least one inlet opening 16 therein, and a discharge pipe 17. The intake tank, of course, may have one or more fixed inlet openings 16. The intake tank preferably rests on the bottom of the pond. The discharge pipe 17 is positioned within the intake tank 15 and extends to a level near the bottom of the tank. Concentrated brine solution 11, in being removed from the pond, passes through inlet opening 16 and into intake tank 15 from which it is withdrawn through discharge pipe 17 by means of a pump (not shown) associated with the pipe.

To prevent salt from the supersaturated solution from depositing and accumulating at the inlet opening 16, as well as in the pipe 17 and the pump, a porous dilution chamber 18 is disposed about the periphery of the inlet opening 16. A conduit 19 communicates with the porous chamber 18 to supply a dilution liquid thereto.

As shown in FIGURES 5 and 6, the dilution chamber comprises a porous material 20 secured to a frame member 21 in such manner as to provide a channel 22 through which the dilution liquid may flow. The frame member 21 extends substantially around the perimeter of the inlet opening 16 and may be formed of any suitable material which is not adversely affected by the concentrated solution in the pond. Any suitable porous material through which the dilution liquid can flow and which has adequate strength may be used in forming the dilution chamber. Thus, suitable porous materials which can be used include canvas, filter cloth, plastic mesh, wire cloth, filter screening and the like. Generally, it is preferred to use fine mesh materials in order to insure uniform flow of the dilution liquid around substantially the entire periphery of the inlet opening. Excellent results have been obtained with a dilution chamber formed of fine mesh stainless steel filter screen secured to a metal frame member.

The shape of the dilution chamber may be varied depending on the cross-section of the frame member 21, the manner in which the porous material 20 is secured to the frame and the like. The shape of the chamber 18 is important only to the extent that it must provide a relatively uniform flow of the dilution liquid around substantially the entire perimeter of the inlet opening.

According to another preferred embodiment of this invention, as shown in FIGURE 2, the conveying means 14 is provided with an inlet opening 16 which is vertically moveable. By utilizing this embodiment, it is possible to initially position the inlet opening 16 at the bottom of the pond and thereafter gradually elevate the same as the depositing salt layer 12 gradually increases in thickness. In this manner, the opening does not become blocked by the salt layer during operation.

In this embodiment a slot 23 is provided in the intake tank 15 to serve as the inlet. A vertically moveable gate member 24 is operatively associated with the slot 23 to control the size of the inlet opening 16. The porous dilution chamber 18 is associated with the gate member 24 in such manner that as the gate 24 is raised or lowered, the dilution chamber 18 and conduit 19 are raised or lowered accordingly. The dilution chamber 18 has about the same dimensions as the desired size of the inlet opening 16. By this arrangement it is possible to maintain the inlet opening 16 at or near the bottom of the pond, realizing that the bottom is progressively rising due to the increasing thickness of the salt layer 12.

Thus, when the evaporating pond is first placed in operation the gate 24 is lowered until the dilution chamber 18 rests on the bottom of the pond. As salt deposits accumulate on the floor of the pond the gate is raised a distance corresponding to the increased thickness of the salt layer 12. In this manner, the inlet opening 16 is maintained near the bottom of the pond while blocking of the inlet by the salt layer is prevented.

In still another embodiment of the invention, intake tank 15 is omitted from conveying means 14. Thus, as illustrated in FIGURES 3 and 4, there is a dilution liquid conduit 19 communicating with a porous dilution chamber 18 disposed around the periphery of an inlet 16a of a discharge pipe 17 positioned in the pond. In this embodiment the supersaturated solution, in being removed from the pond, passes through inlet opening 16a and directly into the discharge pipe 17. The flow of dilution liquid from the porous chamber into the solution being withdrawn from the pond prevents salts from depositing and accumulating on the inlet, pipes, pumps and other conveying equipment. Preferably means (not shown) is provided to enable the discharge pipe 17 and conduit means 19 to be raised as the salt layer 12 increases in thickness at the bottom of the pond.

While water or other liquids which do not adversely affect the solution recovered from the pond may be used as the dilution liquid, the preferred diluent for use in this invention comprises an aqueous mixture of the diluted solution being removed from the pond. Since such diluent has a specific gravity approximately the same as the solution in the pond, the tendency for the diluent to stratify when added to the pond solution is minimized. In addition, the use fo such diluent does not introduce any undesirable ions into the system. Such diluent can be obtained conveniently by mixing water with a portion of the solution withdrawn through the discharge pipe and then introducing it into the dilution liquid conduit from which it flows through the dilution chamber and into contact with the concentrated solution passing through the inlet opening.

While the amount of diluent introduced into the concentrated solution at the inlet opening must be controlled, it will be appreciated that the limits are relatively wide. Thus, if an insufficient amount of dilution liquid is used, the degree of supersaturation of the solution being removed from the pond will not be reduced sufficiently to prevent the deposition of solid salt upon the inlet, pipes and pumps. The use of too much dilution liquid, on the other hand, is undesirable since that will dilute the solution so much as to reduce the efficiency of the overall solar pond evaporation process. It has been found that the addition of between about 0.5% to about 1.0% by volume, based upon the volume of the solution passing through the inlet, is sufficient to reduce the supersaturation of the solution to a satisfactory degree without unduly diluting the solution recovered. Any conventional metering means may be used to control the flow of dilution liquid within these limits.

Example

To demonstrate the effectiveness of the present invention, the conveying means of FIGURE 2 of the drawing was used to withdraw a supersaturated brine solution from a solar evaporating pond. Thus, a cylindrical intake tank having a vertically extending slot as the inlet opening therein was placed in a solar evaporating pond with the tank resting on the bottom of the pond. A gate member was disposed over the slot to close a portion of the opening, with the gate member being slidably moveable vertically to control the size of the inlet opening. A porous dilution chamber comprising a fine mesh stainless steel filter screen attached to a metal frame was secured to the bottom of the gate member. The gate member was lowered until the dilution chamber rested on the bottom of the pond. A discharge pipe was positioned within the intake tank to remove solution therefrom.

An aqueous solution containing NaCl, KCl, $Na_2CO_3$, $Na_2SO_4$ and $Na_2B_4O_7$ then was pumped into the pond to a depth of several feet. Water was evaporated from the solution by solar energy, thereby increasing the concentration of the solution. As still more water was removed by evaporation, NaCl crystallized out and deposited in a layer of progressively increasing thickness over the bottom of the pond. The solution remaining was supersaturated with respect to still more NaCl.

Thereafter, that solution was removed from the evaporating pond by passing it through the inlet opening into the intake tank from which it was pumped through the discharge pipe. Simultaneously, fresh solution was added to the pond at about the same rate.

Throughout the operation, a dilution liquid comprising a mixture of the solution removed from the pond and water was introduced into the dilution chamber in an amount of about 0.8% by volume of the solution passing through the inlet. As the supersaturated solution passed through the inlet opening, the dilution liquid flowed through the screen around the periphery of the inlet and mixed with the solution passing through the inlet to reduce the supersaturation of the solution. In this manner solid salt accumulation at the inlet and on the pipes and pumps was prevented.

During the operation of the pond, the gate was raised periodically as the salt layer on the bottom of the pond increased in thickness, in order to prevent the inlet opening from becoming blocked.

The evaporating pond was operated continuously in this manner for a period of above five months. During that time there was no difficulty with salt clogging the inlet, the pipes or the pump. At the end of the five-month period, the equipment was examined and it was found that there was substantially no salt deposit on the inlet pipes or pumping equipment.

As noted hereinabove, it will be understood that the present invention is not limited to removing brine solutions from solar evaporating ponds; nor is it limited to solutons which are supersaturated with NaCl. Rather, this invention is adapted for use in settling ponds and basins, tanks, reactors and other containers holding a solution which is supersaturated with a salt.

While the invention has been particularly described and illustrated in conjunction with the inlet opening of conveying means for removing a supersaturated solution from an evaporating pond, the porous dilution chamber of this invention may also be used in conjunction with other equipment with which the supersaturated solution comes in contact, in order to prevent the accumulation of salt deposits thereon. For example, as mentioned hereinabove, the supersaturated solution may be transferred into secondary evaporating ponds for further concentration by allowing the solution to flow over a weir separating the ponds. The accumulation of salt on the weir may be prevented in accordance with the present invention by disposing the porous dilution chamber at the lip of the weir. In this manner the dilution liquid, in an amount sufficient to prevent deposition or accumulation of salt, is introduced into the concentrated solution flowing over the weir to thereby maintain the weir free of salt deposits.

Thus, it will be apparent to those skilled in the art that various modifications and changes may be made in the invention as hereinabove described and illustrated without departing from the scope of the invention. It is to be understood that this invention is not limited to the embodiments herein shown and illustrated, but includes all such modifications and changes as come within the scope of the appended claims.

What is claimed is:

1. In a method for withdrawing from a container a solution which is supersaturated with a salt, which method includes diluting said supersaturated solution to reduce its supersaturation while passing said solution through an inlet opening and into conveying means therefor, the improvements which comprise:
   providing a porous dilution chamber substantially about the periphery of said inlet opening,
   introducing a dilution liquid to said dilution chamber and then into contact with said supersaturated solution while it passes through said opening to reduce its supersaturation
   and prevent the deposition of salt on said inlet opening and conveying means.

2. The method as defined in claim 1 in which said inlet opening and said porous dilution chamber are vertically moveable within said container.

3. The method as defined in claim 1 in which said dilution liquid is an aqueous salt solution.

4. The method as defined in claim 1 in which said dilution liquid is introduced at a rate of about 0.5% to about 1.0% by volume, based on the volume of solution passing through said inlet opening.

5. Apparatus for withdrawing from a container a solution which is supersaturated with a salt, which comprises:
   conveying means disposed within said container for removing said solution from said container, said conveying means having at least one inlet opening thereto,
   a porous dilution chamber disposed substantially about the periphery of said inlet opening, and
   conduit means communicating with said porous chamber for supplying a dilution liquid thereto.

6. Apparatus for withdrawing from a container a solution which is supersaturated with a salt, which comprises means, disposed within said container, for conveying said solution from said container including an intake tank into which said solution passes and a discharge pipe within said tank for removing solution therefrom, said intake tank having a vertically extending slot therein to provide an inlet opening to said tank, a vertically moveable gate member operatively associated with said slot to control the size of said inlet opening, a porous chamber secured to said gate member in such manner that it extends substantially around the periphery of said inlet opening and conduit means communicating with said porous chamber for supplying a dilution liquid thereto.

References Cited
UNITED STATES PATENTS

| | | | |
|---|---|---|---|
| 661,609 | 11/1900 | Hoover et al. | 302—15 |
| 2,076,823 | 4/1937 | Newell | 302—14 |
| 2,505,194 | 4/1950 | Loss | 302—14 |
| 2,573,917 | 11/1951 | Luce | 302—15 |
| 3,046,059 | 7/1962 | Roberts | 302—14 |

ANDRES H. NIELSEN, *Primary Examiner.*